(12) United States Patent
Ophardt et al.

(10) Patent No.: US 6,766,924 B1
(45) Date of Patent: Jul. 27, 2004

(54) METERING BALL-VALVE WITH BIASED HOUSING

(75) Inventors: Heiner Ophardt, Vineland, CA (US); Tony Kortleve-Snider, Beamsville, CA (US)

(73) Assignee: Hygiene-Technik Inc., Beamsville (CA)

( * ) Notice: Subject to any disclaimer, the term of this patent is extended or adjusted under 35 U.S.C. 154(b) by 0 days.

(21) Appl. No.: 10/629,767

(22) Filed: Jul. 30, 2003

(30) Foreign Application Priority Data

Jun. 25, 2003 (CA) .............................................. 2433349

(51) Int. Cl.[7] .............................................. G01F 11/00
(52) U.S. Cl. ................................................. 222/368
(58) Field of Search ................................ 222/368, 363

(56) References Cited

U.S. PATENT DOCUMENTS

| | | | |
|---|---|---|---|
| 335,940 | A | 2/1886 | Livingston |
| 2,104,332 | A | 1/1938 | Rhodes et al. |
| 3,283,956 | A | 11/1966 | Craswell |
| 4,058,240 | A | 11/1977 | Becker |
| 5,244,019 | A | 9/1993 | Derby |
| 5,823,401 | A | 10/1998 | Zgoda |
| 6,338,423 | B1 | 1/2002 | Polon |

*Primary Examiner*—Philippe Derakshani
(74) *Attorney, Agent, or Firm*—Riches, McKenzie & Herbert LLP (57) ABSTRACT

A ball-valve in which the housing within which the ball is received comprises two half members resiliently biased together and adapted to separate from each other against such bias.

14 Claims, 7 Drawing Sheets

METERING BALL-VALVE WITH BIASED HOUSING

SCOPE OF THE INVENTION

The present invention relates to a metering ball-valve to dispense a unit volume and, more particularly, to such a ball-valve when received within a resilient split housing.

BACKGROUND OF THE INVENTION

Metering ball-valves are known in which by rotation of the ball-valve in a housing, a blind bore in the ball may be moved from a position in which it receives material to be dispensed in another position in which it may dispense the material received.

Previously known ball-valves suffer the disadvantage, particularly when used for dispensing granular material, that any material which may become adhered to the surface of the ball can prevent rotation of the ball and thus a jamming condition can arise. Such conditions may occur particularly in conditions when materials to be dispensed include granular materials which can become sticky or fused to the ball and become wet as in humid conditions.

SUMMARY OF THE INVENTION

To at least partially overcome these disadvantages of previously known devices, the present invention provides a dispensing ball-valve in which the housing comprises two complementary half members resiliently biased together and adapted for separation from each other.

An object of the present invention is to provide an improved dispensing ball-valve.

Another object of the present invention is to provide a ball-valve in which the housing within which the ball is received comprises two half members resiliently biased together and adapted to separate from each other against such bias.

In one aspect, the present invention provides a ball-valve, comprising:

a housing having an inner spherical cavity with a first port opening into the cavity from a first side of the housing and a second port opening into the cavity from a second opposite side of the housing, a ball concentrically received in the housing in the cavity for rotation about a first axis through the center of the spherical cavity, the ball having spherical outer surfaces for sealed engagement within the cavity, the ball having a blind-bore of a known volume;

the ball adapted to be rotated about the first axis between a first position, in which the blind-bore communicates with the first port, and a second position in which the blind-bore communicates with the second port;

the sealing engagement between the spherical outer surfaces of the ball and the cavity being maintained during rotation of said ball between the first and second positions whereby rotation of the ball between the first and second positions is adapted to move a predetermined volume from communication with the first port to communication with the second port, the housing comprising two complementary half members, a first half member carrying the first port and a second first half member carrying the second port, with each half member carrying about one half of the cavity, the first and second half members coupled together to form the cavity therebetween with a first generally equatorial mating surface on the first half member adapted to removably scalably engage a second generally equatorial mating surface of the second half member, a biasing mechanism resiliently biasing the first and second half members together to urge the first generally equatorial mating surface into sealed engagement with the second generally equatorial mating surface, wherein the first and second half members are adapted to separate from each other over their equatorial mating surface against the bias of the biasing mechanism.

BRIEF DESCRIPTION OF THE DRAWINGS

Further aspects and advantages of the present invention will become apparent from the following description taken together with the accompanying drawings in which:

FIG. 1 is a schematic perspective view of a first embodiment of a dispensing ball-valve;

DETAILED DESCRIPTION OF THE DRAWINGS

Reference is made first to FIGS. 1 to 4 showing a first embodiment of a metering ball-valve 10. The ball-valve 10 is shown as having a valve body 12 formed from a top half member 14 and a bottom half member 16 and a ball 20. The valve body 12 has a spherical cavity 18 centrally therein within which the ball 20 is rotatable journalled about axis 11 by cylindrical stub axles 22 and 24 extending from the ball coaxially about the axis 11. The axis 11 passes through the center 26 of the spherical cavity 18. The stub axles 22 and 24 are rotatably journalled in cylindrical axle bearing surfaces 28 and 30 coaxial about the axis 11. One half of each of the bearing surfaces 28 and 30 are formed in each of the half members 14 and 16.

The valve body 12 has an inlet passageway 32 at its top through the top half member 14 and an outlet passageway 34 at its bottom through the bottom half member 16. The ball 20 is disposed within the spherical cavity 18 within the valve body 12. The ball 20 has a cylindrical blind bore 36 formed therein about an axis 40 passing through the center 26 of the spherical cavity 18 and normal the axis 11. The blind bore 36 is closed at one blind end 38 and open at the other blind end 40. The ball 20 is arranged for rotation about the axis 11 as journalled between the half members 14 and 16 by reason of the cylindrical stub axles 22 and 24 on opposite sides of the ball 20 being journalled in the cylindrical bearing surfaces 28 and 30 through the half members 14 and 16. One of the cylindrical stub members 14 carries a keyhole 42 which is adapted to receive a shaft 44 to rotate the ball 20.

Figure 2:
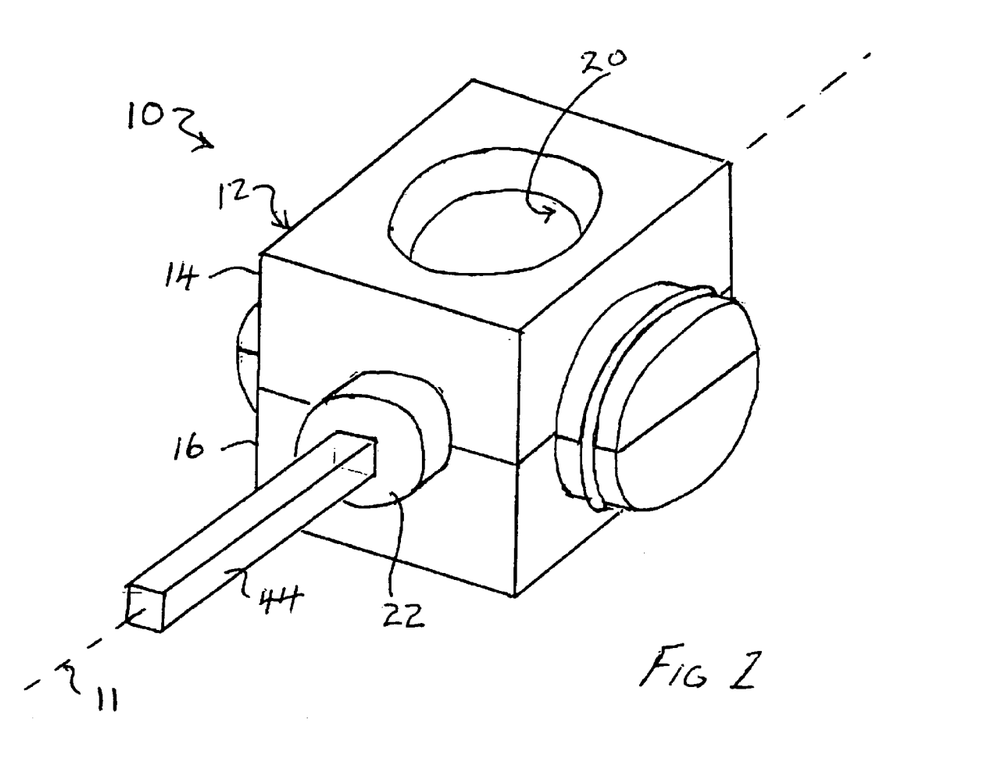
FIG. 2 is a cross-sectional view along section line 2–2' in FIG. 1 showing the ball-valve in a receiving position in conjunction with a hopper.
Figure 3:
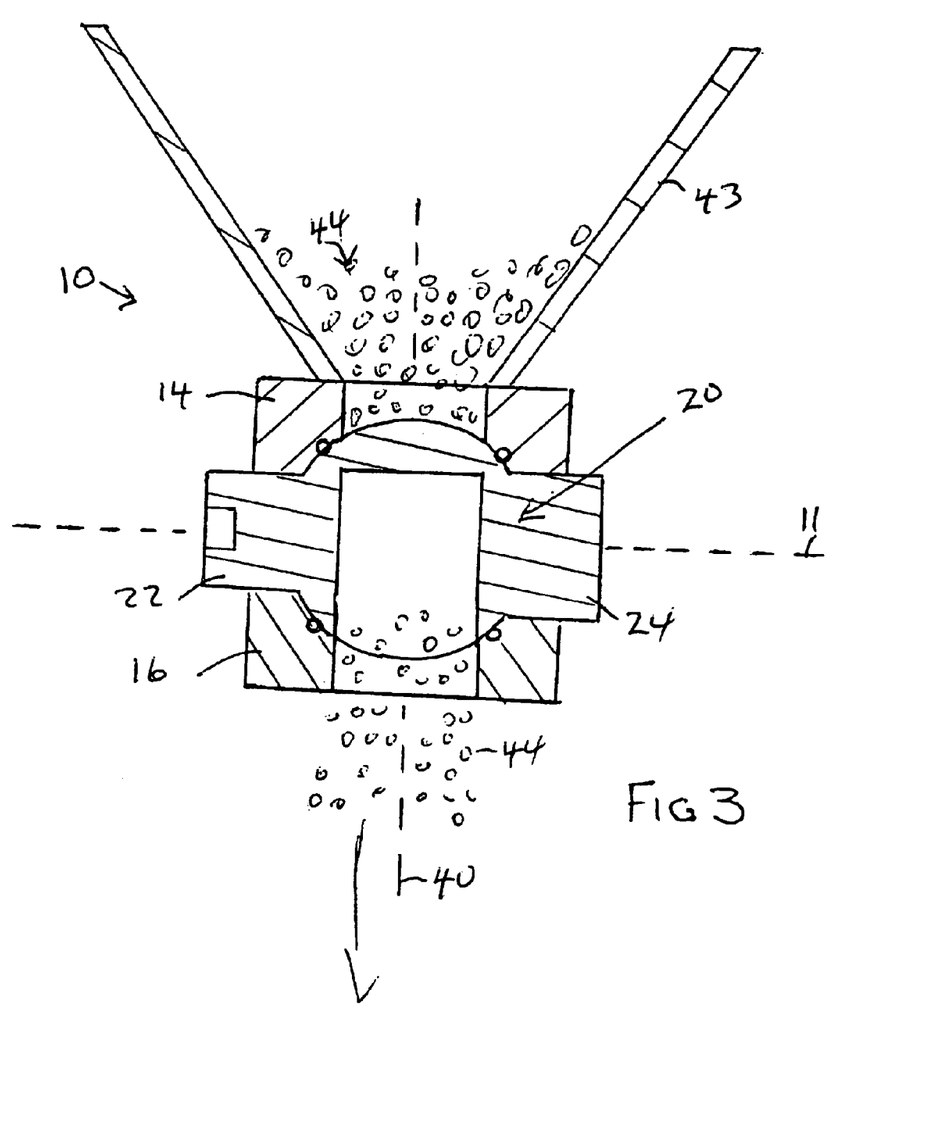
FIG. 3 is a cross-sectional view similar to FIG. 2, however, with the ball-valve in a dispensing position.
Figure 4:
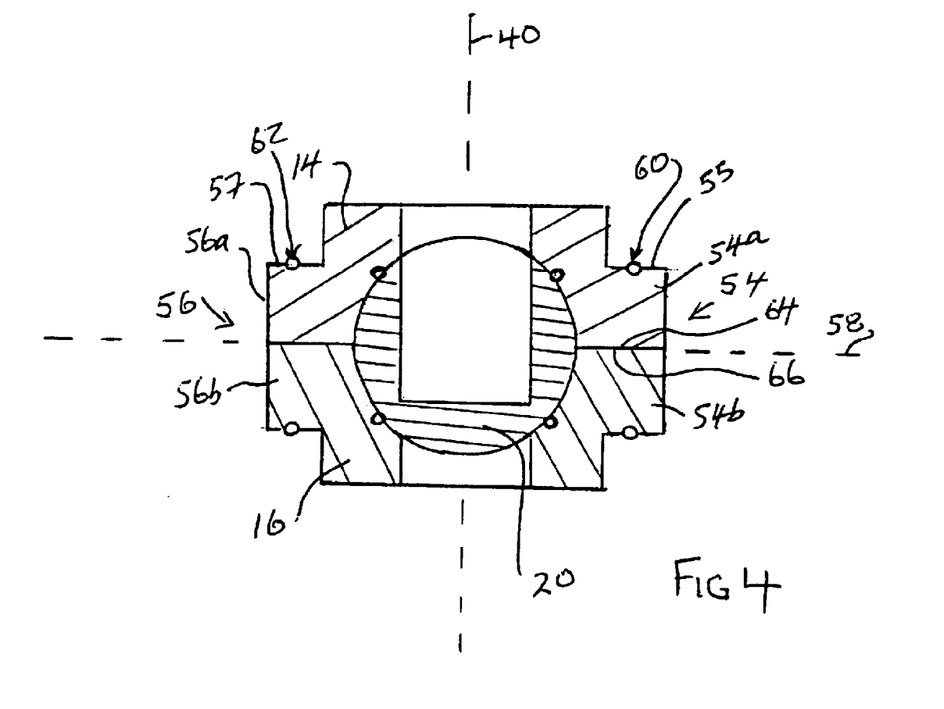
FIG. 4 is a cross-sectional view along section line 4–4' of FIG. 1.

The ball 20 is rotatable from a fill or receiving position as seen in FIG. 2 in which the bore 36 within the ball 20 is open to a hopper 43 and material 44 in the hopper 43, such as solid material 44 may, under gravity, flow down through the inlet passageway 32 to fill the bore 36 inside the ball 20. From this position, the ball 20 may be rotated about the axis 11 to the feed or dispensing portion as shown in FIG. 3 in which the ball 20 closes communication to the hopper 43 and the bore 36 within the ball 20 becomes open to the outlet passageway 34 out of the valve body 12 such that material 44 which is received inside the bore 36 of the ball 20 is dispensed under gravity. In this manner, it is to be appreciated that by rotation of the ball as on shaft 44 by a motor or manually or the like, the ball 20 will come to receive material 44 from the hopper 43 and then subsequently dispense the same.

To provide for sealing between the ball 20 and the valve body 12, two upper and lower O-rings 46 and 48 are disposed coaxially about axis 40 about each of the inlet passageway 32 and the outlet passageway 34 which O-rings engage and form a seal between the exterior spherical surface 50 of the ball 20 and the interior spherical surface 52 of the cavity 18. The O-rings 46 and 48 are received within grooves formed in the interior spherical surface 52 of the cavity 18.

The valve body 12 includes two external bosses 54 and 56, one on each side of the housing. Each boss 54 and 56 is disposed coaxially about an axis 58 which is normal to each of the axis 11 and the axis 40. A top half 54a and 56a of each boss comprises part of the top half member 14 and a bottom half 54b and 56b of each boss comprises part of the bottom half member 16. As seen in the Figures, the bosses 54 and 56 together comprise a cylindrical member disposed coaxially about the axis 58 with the top half 54a and 56a of each boss comprising a member which is generally semi-circular in cross-section and mates with the bottom half 54b and 56b of each boss which is also semi-circular in cross-section. Each of the bosses 54 and 56 provide a circular shoulder surface 55 and 57, respectively, directed normal to a radius from the axis 58. In this regard, an annular groove is provided about each boss 54 and 56 in the circular shoulder surface directed normal to the axis 58.

Two resilient O-rings 60 and 62 are mounted on each of the bosses 54 and 56 within the annular groove such that each of the O-rings engage the circular shoulder surfaces and under compression bias the first and second half members 14 and 16 together.

In the preferred embodiments shown, the O-rings 60 and 62 which urge the half members 14 and 16 together by being received about the bosses 54 and 56 are of the same size as the O-rings 46 and 48 disposed between the ball 20 and the cavity 18.

The O-rings 60 and 62 which are disposed about the bosses 54 and 56 are sized so as to fit securely thereabout and bias the first and second half members 14 and 16 together to urge a first generally equatorial mating surface 64 carried on the top half member 14 into substantially sealed engagement with a second generally equatorial mating surface 66 carried on the bottom half member 16.

The fact that the top and bottom half members 14 and 16 are resiliently biased together has the advantage that if, for example, particles of the granular material 44 may become adhered to the exterior spherical surface 50 of the ball 20, on rotating the ball 20, rather than damage occurring to the ball 20 or to the half members 14 and 16 as could occur in a potential jam situation, with rotation of the ball 20 having effectively an enlarged radius due to the adhered material, the two half members 14 and 16 of the valve body 12 will spread apart against the bias of the resilient O-rings 60 and 62.

The dispensing ball-valve in accordance with the present invention is particularly directed for use in dispensing particulate matter from the hopper 43. The shaft 44 is preferably rotated either continuous or, more typically, periodically as whenever desired to dispense a unit volume of material 44 as by some mechanical mechanism for rotation. A preferred motor for rotation may be an electromechanical device as, for example, an accurately controlled step electric motor. Alternatively, a preferred motor may comprise a pneumatic motor driven by air pressure which has the advantage of stalling if forces resisting rotation of the ball are too great.

While the dispensing ball-valve in accordance with the present invention is particularly adapted for use in dispensing granular solid materials and powders, the device is also useful for dispensing liquids and slurries.

While not necessary, to assist in ensuring that the ball 20 is oriented in the correct position within the valve body 12, it is preferred that the stub axles 22 and 24 have different diameters.

Figure 5:
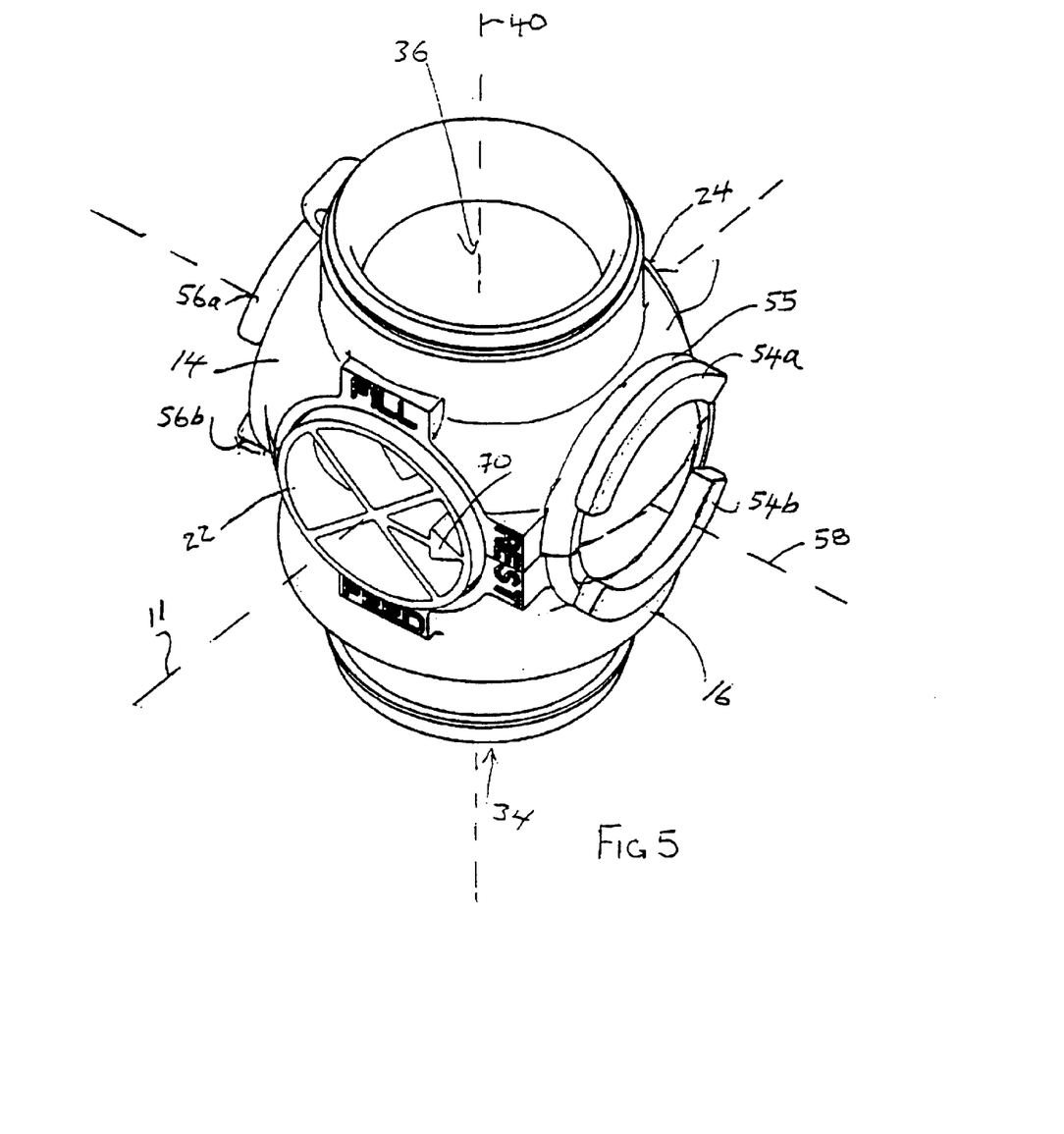
FIG. 5 is a birds-eye pictorial view of a second embodiment of a ball-valve in accordance with the present invention with the biasing O-rings removed.
Figure 6:
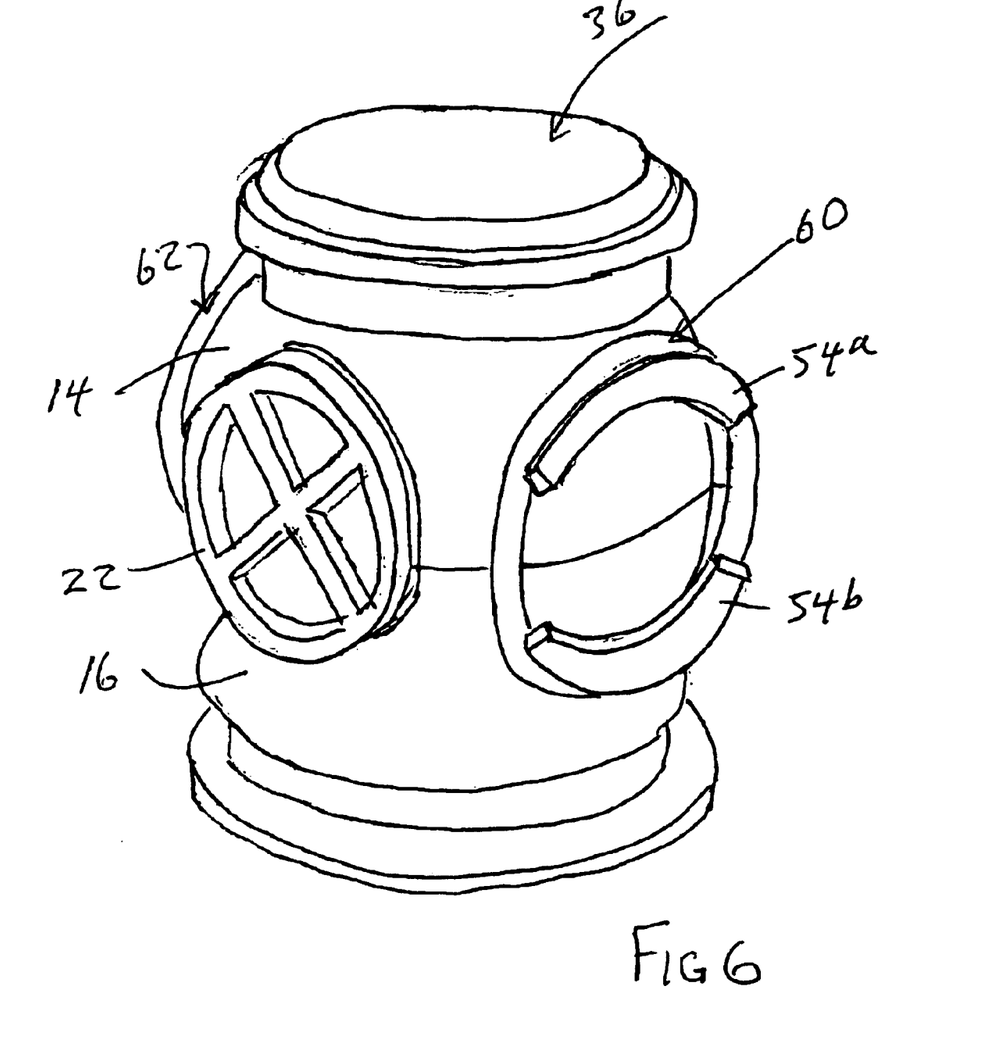
FIG. 6 is a frontal pictorial view of the ball-valve of FIG. 5 with the biasing O-rings in place.
Figure 7:
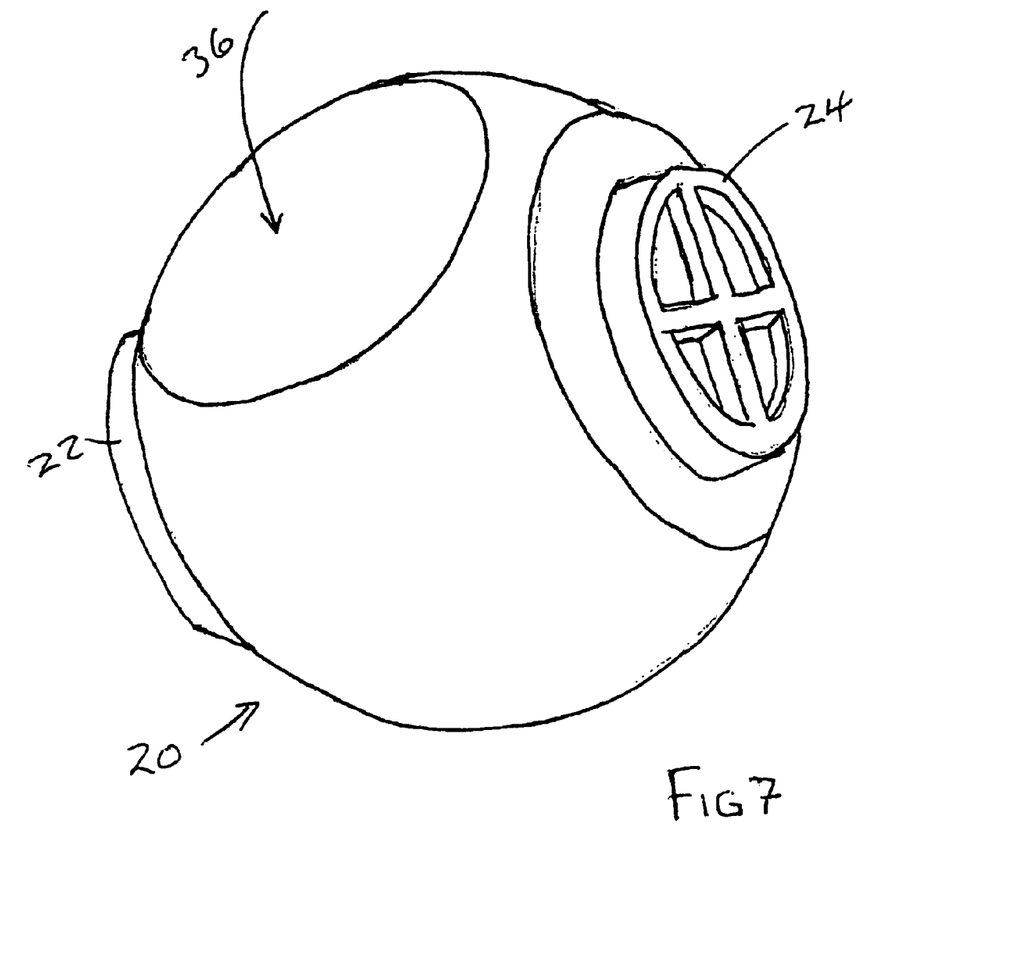
FIG. 7 is a pictorial view of the ball from the ball-valve of FIG. 5.

Reference is now made to FIGS. 5, 6 and 7 which show a second embodiment of the dispensing ball-valve 10 in accordance with the present invention as is adapted to have its various components formed as by injection moulding.

For ease of illustration in FIG. 6, the O-rings 60 and 62 are not shown. FIG. 6 shows the O-rings 60 and 62 secured about the bosses 54 and 56 on the valve half members 14 and 16.

The stub axle 22 is provided at its end with an indication arrow 70 which indicates the relative position of the ball 20. The exterior side surface of the valve body 12 about the end of the stub axle 22 is provided with markings indicating whether the ball valve is in the receiving, "FILL" position or the dispensing "FEED" position or a "REST" position intermediate the two in which no dispensing is to take place. The second embodiment may be adapted for use in which the ball is merely rotated through 180 degrees between the FILL and the FEED position as in a manner that the ball 20 is normally maintained in the REST position, however, when it is desired to dispense feed is moved first to the FILL position for filling and then subsequently to the FEED position for dispensing. After dispensing, material is then moved to the REST position until the valve may be desired to be used again.

While the invention has been disclosed with reference to the preferred embodiments, many modifications and variations will now occur to a person skilled in the art. For a definition of the invention, reference is made to the appended claims.

We claim:

1. A ball-valve, comprising:

a housing having an inner spherical cavity with a first port opening into the cavity from a first side of the housing and a second port opening into the cavity from a second opposite side of the housing, a ball concentrically received in the housing in the cavity for rotation about a first axis through the center of the spherical cavity, the ball having spherical outer surfaces for sealed engagement within the cavity, the ball having a blind-bore of a known volume;

the ball adapted to be rotated about the first axis between a first position, in which the blind-bore communicates with the first port, and a second position, in which the blind-bore communicates with the second port;

the sealing engagement between the spherical outer surfaces of the ball and the cavity being maintained during rotation of said ball between the first and second positions whereby rotation of the ball between the first and second positions is adapted to move a predetermined volume from communication with the first port to communication with the second port, the housing comprising two complementary half members, a first half member carrying the first port and a second first half member carrying the second port, with each half member carrying about one half of the cavity, the first and second half members coupled together to form the cavity therebetween with a first generally equatorial mating surface on the first half member adapted to removably sealably engage a second generally equatorial mating surface of the second half member, a biasing mechanism resiliently biasing the first and second half members together to urge the first generally equatorial mating surface into sealed engagement with the second generally equatorial mating surface.

2. A ball-valve as claimed in claim 1 wherein the housing includes two external bosses, one on each side of the housing, each boss disposed coaxially about a second axis passing through the center of the spherical cavity and presenting a circular shoulder surface directed normal a radius from the axis, each boss comprising two halves, a first half of each boss comprising part of the first half member and a second half of each boss comprising part of the second half member, the biasing mechanism comprising two resilient circular rings, one ring mounted on each of the bosses engaging portions of the circular shoulder over both the fire and second halves of its respective boss and by urging the first and second halves of its respective boss together thereby urging the two half members together.

3. A ball-valve as claimed in claim 1 including an opening into the cavity coaxial with the first axis via which coupling is made between the ball and a mechanism external of the ball-valve to rotate the ball about the axis.

4. A ball-valve as claimed in claim 3 wherein the opening having journaling surfaces coaxial with the axis for journaling of the ball for rotation about the first axis.

5. A ball-valve as claimed in claim 1 wherein the ball includes a spherical core and two stub axles, one on each side of the core extending outwardly from the core coaxial to the first axis, each stub axle having external journaling surfaces coaxial to the first axis, the housing including two axle bearings, one on each side of the housing coaxial to the first axis and presenting journaling surfaces coaxial to the first axis complementary to the external journaling surfaces on the stub axles for engagement therewith to journal the ball in the housing for rotation about the first axis, each axle bearing comprising two halves, a fist half of each axle bearing comprising part of the first half member and a second half of each axle bearing comprising part of the second half member.

6. A ball-valve as claimed in claim 2 wherein the ball includes a spherical core and two stub axles, one on each side of the core extending outwardly from the core coaxial to the first axis, each stub axle having external journaling surfaces coaxial to the first axis, each boss including a bore opening into the cavity coaxial with the axis and presenting journaling surfaces coaxial to the first axis complementary to the external journaling surfaces on the stub axles for engagement therewith to journal the ball in the housing for rotation about the first axis.

7. A ball-valve as claimed in claim 6 wherein a first of the stub axles has external journaling surfaces of a different radius than a radius of similar external journaling surfaces of a second stub axle.

8. A ball-valve as claimed in claim 7 wherein the surfaces of each boss being circular about the second axis in cross-section.

9. A ball-valve as claimed in claim 1 wherein the cavity having a spherical inner surface, two resilient o-rings each disposed in a respective recess in the spherical inner surface circumferentially about the first axis to a respective side of the first port and the second port to engage the ball and form a seal therewith on rotation of the ball about the axis.

10. A ball-valve as claimed in claim 2 wherein the cavity having a spherical inner surface, two resilient o-rings each disposed in a respective recess in the spherical inner surface circumferentially about the first axis to a respective side of the first port and the second port to engage the ball and form a seal therewith on rotation of the ball about the axis;

the two resilient o-rings and the two sealing rings being interchangeable.

11. The ball-valve as set forth in claim 1 further comprising a mechanism to rotate the ball between said first and second positions.

12. The ball-valve as set forth in claim 11 wherein said mechanism to rotate the ball includes a slot in said ball adapted to be engaged by a shaft.

13. The ball-valve as set forth in claim 1 wherein said first end communications with a first vessel containing a flowable material, and said second end communications with an outlet;

whereby rotation of said ball from said first to said second positions will move a predetermined amount of said material from said first vessel to said outlet.

14. The ball-valve as set forth in claim 1 wherein said first end communications with a first vessel containing a first flowable material, and said second end communications with a second vessel;

whereby rotation of said ball from said first position to said second position will move a predetermined amount of said material equal to the volume of said blind bore from said first vessel to the second vessel.

* * * * *

UNITED STATES PATENT AND TRADEMARK OFFICE
CERTIFICATE OF CORRECTION

PATENT NO. : 6,766,924 B1
DATED : July 27, 2004
INVENTOR(S) : Ophardt, Heiner and Kortleve-Snider, Tony

It is certified that error appears in the above-identified patent and that said Letters Patent is hereby corrected as shown below:

Column 5,
Line 36, "fire" should be -- first --;

Column 6,
Lines 45, 46, 52 and 53, "communications" should be -- communicates --.

Signed and Sealed this

Seventeenth Day of January, 2006

JON W. DUDAS
*Director of the United States Patent and Trademark Office*